A. L. KNAUSS.
WHEEL.
APPLICATION FILED DEC. 9, 1916.
1,266,025.
Patented May 14, 1918.
2 SHEETS—SHEET 1.
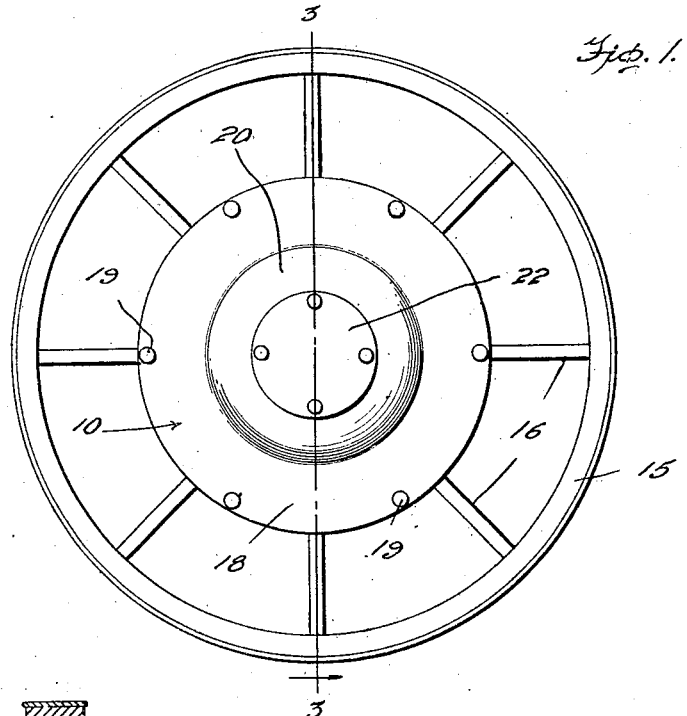
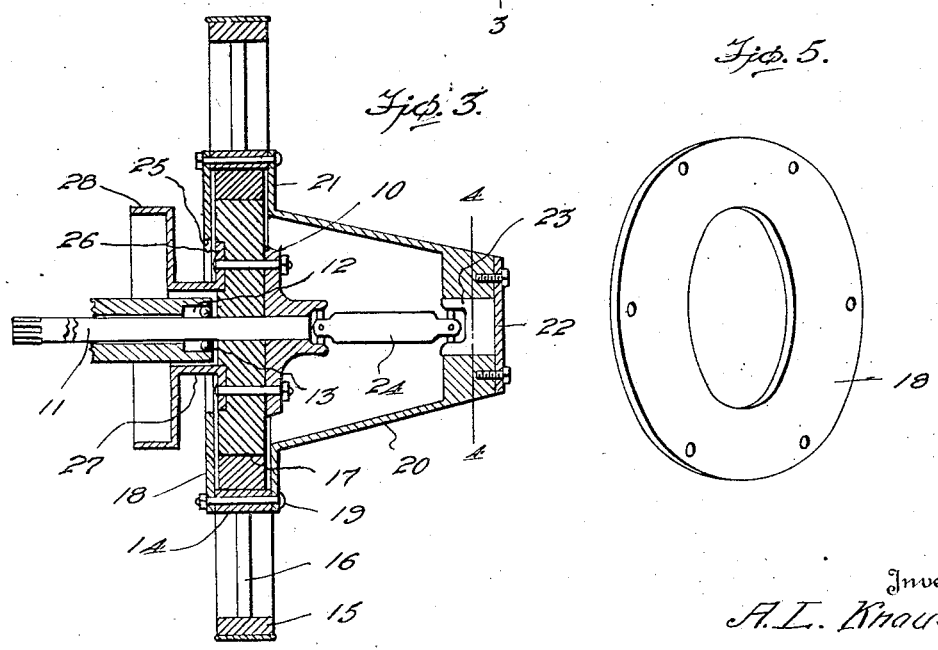

A. L. KNAUSS.
WHEEL.
APPLICATION FILED DEC. 9, 1916.

1,266,025.

Patented May 14, 1918.
2 SHEETS—SHEET 2.

Inventor
A. L. Knauss.

Witness

UNITED STATES PATENT OFFICE.

ALBERT LESTER KNAUSS, OF SUGAR CITY, IDAHO.

WHEEL.

1,266,025.

Specification of Letters Patent.

Patented May 14, 1918.

Application filed December 9, 1916. Serial No. 136,029.

*To all whom it may concern:*

Be it known that I, ALBERT LESTER KNAUSS, a citizen of the United States, residing at Sugar City, in the county of Fremont and State of Idaho, have invented certain useful Improvements in Wheels, of which the following is a specification, reference being had therein to the accompanying drawing.

This invention relates to vehicle wheels and has particular reference to a truck wheel designed to possess a maximum degree of resiliency and give, to absorb the shock incident to the travel of the vehicle over rough surfaces.

The nature and advantages of the invention will be better understood from the following description when taken in connection with the accompanying drawings, the invention residing in the construction, combination and disposition of the parts as claimed.

In the drawings forming part of this specification like numerals of reference indicate similar parts in the several views and wherein:—

Figure 1 is a side elevation of a wheel constructed in accordance with my invention.

Fig. 3 is a sectional view taken on line 3—3 of Fig. 1 looking in the direction of the arrow.

Fig. 5 is a detail view of the wear plate.

Figure 2:
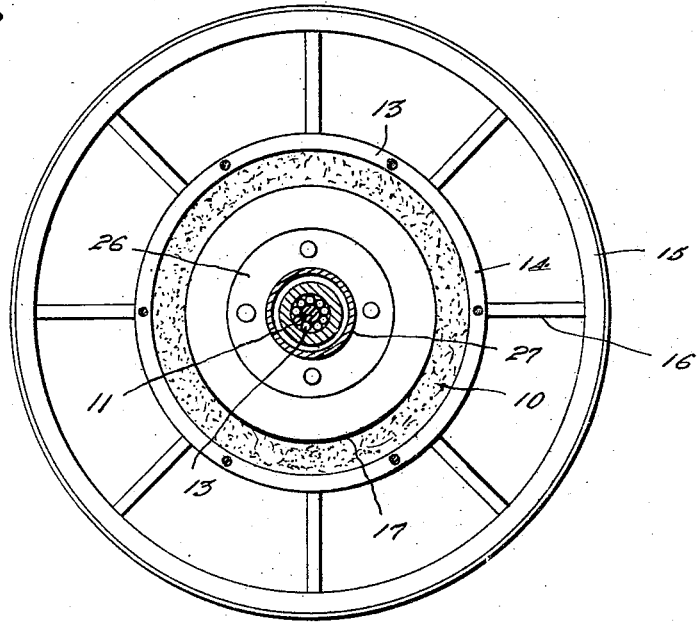
Fig. 2 is a side elevation of my invention showing the plate 18 removed therefrom.
Figure 6:
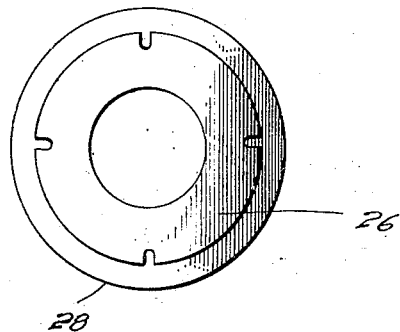
Fig. 6 is an end view of the cap.
Figure 4:
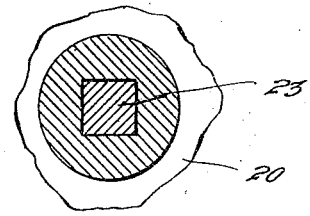
Fig. 4 is a sectional view taken on line 4—4 of Fig. 3.

A wheel constructed in accordance with my invention embodies a hub 10 through which the shaft 11 extends, while fixed upon the shaft is a ball retainer 12 for the reception of the ball bearings 13 as shown. Concentrically disposed about the hub 10 is a band 14 which is connected with the felly 15 through the instrumentality of the spokes 16. Interposed between the hub 10 and the band 14 is a yieldable annulus 17 which as shown in this specific instance consists of rubber, although a coil spring or other yieldable elements may be employed if so desired (not shown). The yieldable annulus is retained in position by means of a disk-like plate 18 secured to the band 14 by means of bolts 19, and a metallic cap 20 which is provided with a circumferential flange 21 secured to the opposite side of the band by means of the bolts 19. The cap 20 constitutes a hub cap which projects an appreciable distance beyond one side of the wheel and is closed at its outer end by means of a removable plate 22. Positioned within the cap 20 is a block 23 connected with the shaft 11 by means of a link 24, which latter forms a part of a universal connection with the shaft 11 and the block 23, and which permits of a certain amount of play of the wheel, but positively drives the latter as the shaft is rotated. The universal connection permits the wheel to give or yield upon the annulus 17 for the purpose of absorbing the shock and jar of the vehicle incident to its travel over irregular surfaces, as will be readily understood, but end play of the wheel is positively prevented by reason of the arrangement of the parts.

Secured to the inner side of the hub 10 and within the opening 25 of the plate 18 is a plate 26 extended inwardly as at 27 and terminating to provide a relatively large brace band 28 which encircles the shaft 11. A wheel constructed in accordance with my invention is not only strong and durable, but possesses the maximum degree of resiliency consistent with strength and durability.

While I have shown and described what I consider the preferred embodiment of my invention, I desire to have it understood that I do not limit myself to this precise construction and arrangement of parts, and that such changes may be resorted to when desired as fall within the scope of what is claimed.

What is claimed is:—

In a device of the class described in combination, a wheel, having spokes and a ring like member, an annular member secured against one edge of said ring like member, a cap having a base flange of the same width and diameter as said annular member secured to the other edge of said ring like member, an annular rubber cushion fitting said ring like member of said annular member and the mentioned flange, a hub embraced by said rubber cushion, a rotatable shaft in said hub, a transverse block formed integrally about the outer end of said cap and having a rectangular bore closed at its outer end, a rectangular slidable member of a length equal to the width of said block and slidable therein, and a connecting link pivotally connecting said shaft and said rectangular member.

In testimony whereof I affix my signature.

ALBERT LESTER KNAUSS.

Copies of this patent may be obtained for five cents each, by addressing the "Commissioner of Patents, Washington, D. C."